US007043060B2

(12) United States Patent
Quintana

(10) Patent No.: US 7,043,060 B2
(45) Date of Patent: May 9, 2006

(54) FINGERPRINT-ACTUATED PADLOCK

(75) Inventor: Richard Quintana, Westminster, CA (US)

(73) Assignee: Niccole Family Trust, Huntington Beach, CA (US)

( * ) Notice: Subject to any disclaimer, the term of this patent is extended or adjusted under 35 U.S.C. 154(b) by 629 days.

(21) Appl. No.: 09/908,108

(22) Filed: Jul. 17, 2001

(65) Prior Publication Data

US 2003/0016847 A1 Jan. 23, 2003

(51) Int. Cl.
*G06K 9/00* (2006.01)

(52) U.S. Cl. ........................................................ 382/124

(58) Field of Classification Search ................ 382/115, 382/116, 124–127, 312; 235/379, 380; 356/71, 356/451; 713/185, 186; 340/5.53, 5.83; 70/25

See application file for complete search history.

(56) References Cited

U.S. PATENT DOCUMENTS

| | | | |
|---|---|---|---|
| 4,768,021 A | 8/1988 | Ferraro | |
| 5,138,468 A | 8/1992 | Barbanell | |
| 5,579,909 A | 12/1996 | Deal | |
| 5,701,770 A | 12/1997 | Cook et al. | |
| 5,886,644 A | 3/1999 | Keskin et al. | |
| 5,963,657 A | 10/1999 | Bowker et al. | |
| 6,100,811 A | 8/2000 | Hsu et al. | |
| 6,401,501 B1 * | 6/2002 | Kajuch et al. | 70/25 |
| 2002/0034321 A1 * | 3/2002 | Saito et al. | 382/124 |

FOREIGN PATENT DOCUMENTS

| | | |
|---|---|---|
| WO | WO 01/03491 | 1/2001 |

* cited by examiner

*Primary Examiner*—Vikkram Bali
(74) *Attorney, Agent, or Firm*—James G. O'Neill, Klein, O'Neill & Singh, LLP

(57) ABSTRACT

A microprocessor-operated keyless entry padlock includes a fingerprint sensor for reading a fingerprint and comparing it to at least one fingerprint stored in memory in the padlock. If a match is found the padlock may be manually opened by a knob or automatically opened by actuating a drive gear to move a gear portion connected to a locking bar to open the locking bar.

5 Claims, 4 Drawing Sheets

FINGERPRINT-ACTUATED PADLOCK

BACKGROUND OF THE INVENTION

1. Field of the Invention

This invention relates generally to locking devices, and more particularly, to a fingerprint-actuated padlock allowing keyless operation of the padlock.

2. Description of Related Art

As many persons are aware, after having locked an item, such as a chain, locker, storage case, sports equipment, or the like using a padlock having a key operated or combination lock, the loss of the key or the forgetting of the combination to the lock can cause problems. Furthermore, if the lock is destroyed to open the item being locked, unwanted costs are incurred in replacing the lock.

Many types of devices are known having holographic or fingerprint actuated locking devices or methods for locking various types of mechanisms. However, these known devices and methods do not relate to padlocks, nor do they indicate how they could be applied to a padlock.

The present invention provides a padlock incorporating a keyless operating means actuated by reading the fingerprint of an authorized user that has been entered into the padlock, and is usable in instances where it is desirable to have keyless unlocking of the padlock.

To conserve battery life, the present invention preferably includes an actuating means, such as a button to turn on a fingerprint scanning system that reads the fingerprint of an authorized user and allows the padlock to be unlocked or unlocks the padlock.

SUMMARY OF THE INVENTION

Accordingly, it is a general object of the present invention to provide an improved locking device. It is a particular object of the present invention to provide an improved keyless operated padlock. It is yet another particular object of the present invention to provide an improved fingerprint actuated padlock having a motor operated locking mechanism therein. It is still another particular object of the present invention to provide an improved fingerprint actuated padlock having a microprocessor-controlled reader held therein. It is a further particular object of the present invention to provide an improved fingerprint actuated padlock having a microprocessor-operated unlocking means connected to a power source held in the padlock for unlocking a locking mechanism in the padlock. And, it is a still further object of the present invention to provide a padlock with a key operated portion for use as an override and for recording the fingerprint of one or more authorized users to enable keyless operation of the padlock by such authorized users.

These and other objects and advantages of the present invention are achieved by providing a padlock having a built-in fingerprint reading means mounted in a pre-selected location and having a microprocessor electrically connected between a power source and an opening means for activating an unlocking mechanism held in the padlock, after reading an authorized fingerprint.

BRIEF DESCRIPTION OF THE DRAWINGS

The objects and features of the present invention, which are believed to be novel, are set forth with particularity in the appended claims. The present invention, both as to its organization and manner of operation, together with further objects and advantages, may best be understood by reference to the following description, taken in connection with the accompanying drawings, wherein:

DESCRIPTION OF THE PREFERRED EMBODIMENTS

Figure 1:
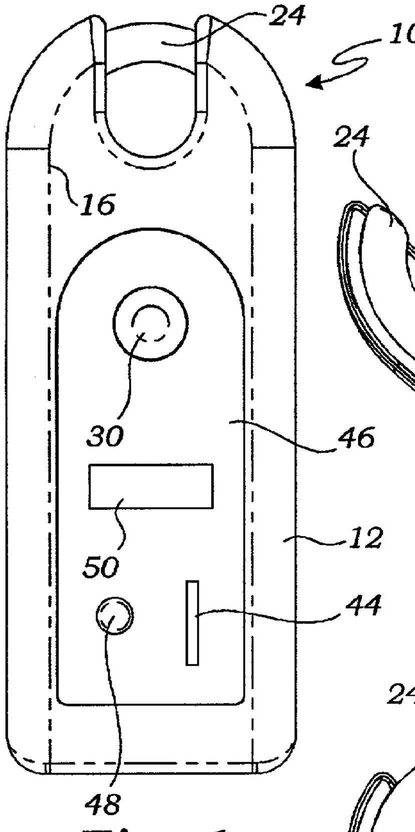
FIG. 1 is a front elevational view of one embodiment of a fingerprint actuated padlock of the present invention.

The following description is provided to enable any person skilled in the art to make and use the invention and sets forth the best modes contemplated by the inventor of carrying out his invention. Various modifications, however, will remain readily apparent to those skilled in the art, since the generic principles of the present invention have been defined herein specifically to provide for an improved fingerprint actuated padlock generally indicated at 10.

It is to be understood that the present invention relates to all types of padlocks having a bar or shackle-type locking means held in a locking position within a housing and electrically or manually actuated by a rack and pinion type operating means to the opened or unlocked position.

Turning now to the drawings, there shown are a number of presently preferred embodiments of the padlock 10 having a body or housing 12, preferably elongated, comprised of a plurality of elements, such as a rear plate 14, a face plate 16 and inner plates 18, 20. The inner plates 18, 20 are preferably made from metal and connected together by a plurality of securing elements 22, such as rivets or the like. The rear plate 14 and face plate 16 are preferably made from plastic or the like and secured to the inner plates by further securing elements 25, such as screws or the like. A gear-actuated locking element or means 24, such as a bar or shackle, is held between the inner plates 18, 20. For purposes of explanation only the bar or shackle 24 is shown as being rotatably held between contoured portions 26 of inner plates 18, 20. The bar or shackle 24 could, of course, be spring biased and/or of any desired shape, such as U-shaped. A gear element, portion or rack 28 is attached to or formed on the bar or shackle 24 for actuation or rotation thereof, as described more fully below.

Figure 3:
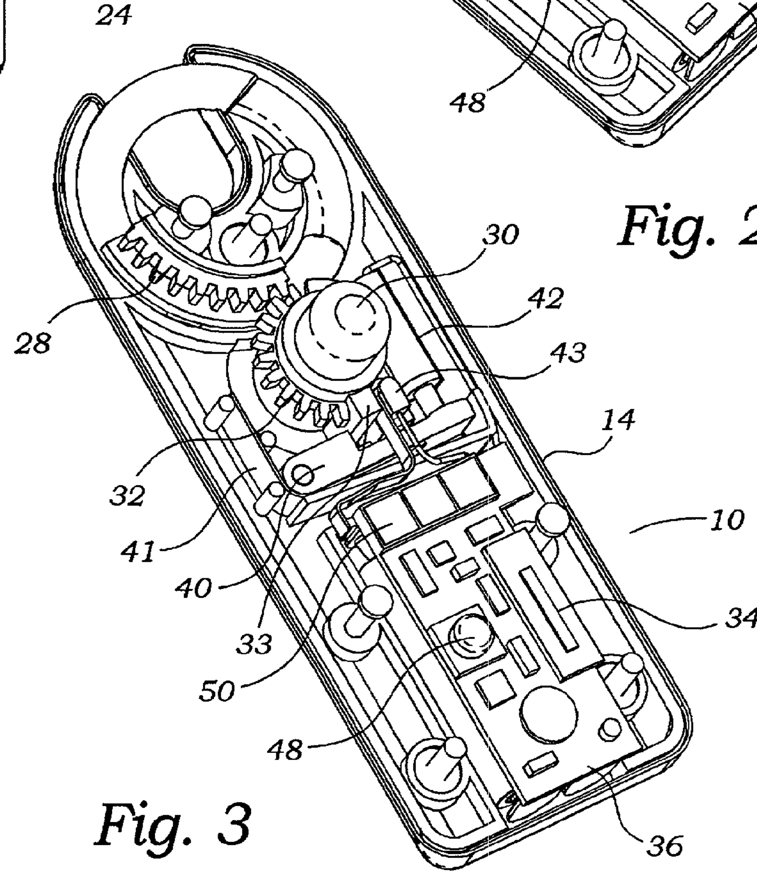
FIG. 3 is a front perspective view of the interior of the padlock of the present invention in the closed or locked position.

The bar or shackle 24 is actuated by a knob or motor 30 by means of a drive gear or pinion 32. Upon actuation of the knob or motor 30, as described below, the drive gear 32 will be rotated to move gear portion 28, to move or rotate the bar or shackle 24, from the closed or locked position (see FIGS. 1 and 3), so as to open the padlock 10. The drive gear 32 may be directly connected between a drive shaft of the knob or motor 30 and gear portion 28, or may be connected to intermediate gears or a gear reducer. The knob 30 may be manually actuated to open the bar 24. If an electrical motor 30 is used, it must be sized and dimensioned to fit within the knob 30 or a housing in the padlock 10 and to have sufficient torque to open the padlock under worst case power availability and temperature conditions. At the same time, the motor must be capable of being operated at low power so as not to quickly drain the power source.

Figure 2:
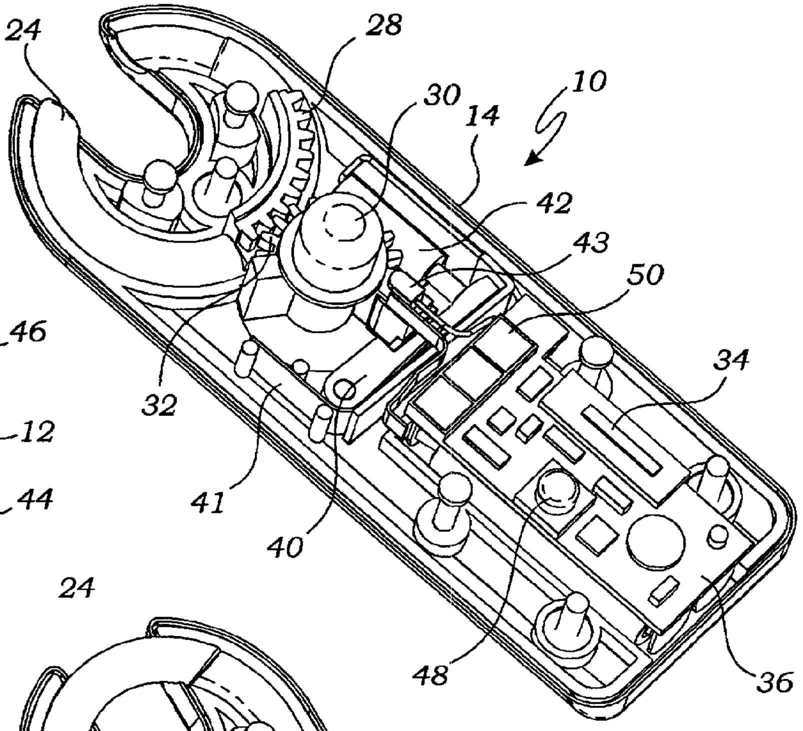
FIG. 2 is a front perspective view of the interior of the padlock of the present invention in the open or unlocked position.
Figures 4, 4A:
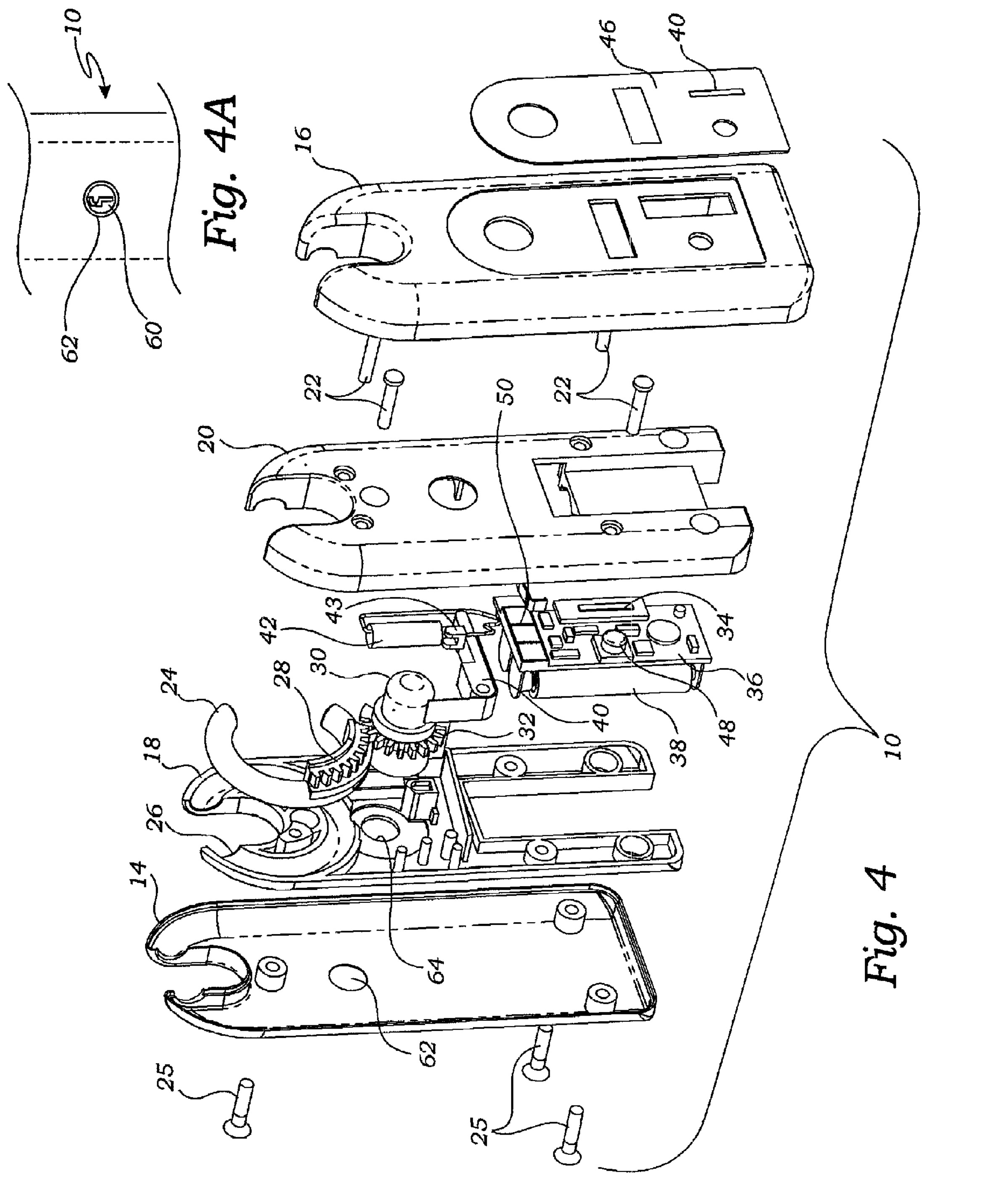
FIG. 4 is an exploded perspective view of a fingerprint actuated padlock of the present invention, showing a gear-operated locking means mounted in a housing, together with a fingerprint reader electrically connected between a power source, a microprocessor and an actuating means for unlocking the locking means.
FIG. 4A is a partial rear view of an assembled padlock of the present invention showing a keyswitch.

As shown in FIG. 4, a fingerprint sensor 34, which may be of any known type, such as a capacitive, optical or thermal, is secured in a pre-selected area to a circuit board 36 having a power source 38, such as one or more batteries, between the inner plates 18, 20. The sensor 34 is directly connected to a microcontroller or microprocessor held on the circuit board 36. When an authorized fingerprint is detected or sensed by sensor 34 a signal is sent to the microprocessor, and either the knob 30 is released and turned, as explained below, or the motor 30 is actuated by the power source 38 to rotate and open the bar or shackle 24 (see FIG. 2), by means of the gear drive 32 and gear portion 28. Before the knob 30 is turned or the motor 30 may operate, a latch arm or lever 40 is actuated by a solenoid 42, to release the holding element 33 on gear 32. The latch 40 may include a spring 41 held in the inner plates 18, 20. The mechanism may be designed so that the motor 30 only unlocks the bar or shackle 24, whereby a user must manually close the lock.

A lock or program sensor 43 is mounted adjacent the latch 40 to sense if the latch is in the open or closed position. The fingerprint sensor 34 is preferably mounted behind or protected by a window or the like 44 held in a cover plate 46 secured to the faceplate 16. Additionally, to save power, when in the standby mode the circuit is designed to draw nearly zero current. Therefore, when it is desired to open the lock it is preferable to have a button or switch 48 that must be pressed or activated to start the power-up process. An authorized user may then pass their finger across sensor window 44 to have their fingerprint read to activate the motor or allow the knob to be turned to open the lock 10.

Turning to FIG. 4A, there shown is a partial portion of the back of the padlock 10 showing a keyswitch 60. The keyswitch is accessible through opening 62, 64, through the rear plate 14 and inner plate 18. The keyswitch 60 has three positions: open, closed and record. It is preferable to only allow the key to be removed in the closed position. If the lock fails to operate due to battery drain or other fault, it may be unlocked by inserting the key and turning it to the open position which will either open the locking bar or allow the locking bar to be opened. This function is purely mechanical and does not require any assistance from the microcontroller or other circuitry. The keyswitch 60 provides a fail-safe override so that the padlock 10 may always be opened with a key.

If the key is inserted and turned to the record position, the fingerprint sensor 34 is activated. The locking bar 34 is preferably opened so as to interrupt the program sensor 43. A user's fingerprint is sampled and the minutia is extracted and stored in memory as a data set. If the design allows only for one data set to be stored, then each time a fingerprint is stored in record mode it erases the previous set.

To record multiple fingerprints for more than one authorized user, each user may be required to return the key back to the closed position and then to record again. This would assure that previously stored data sets are not inadvertently erased. If memory capacity allows for multiple fingerprints to be stored, then the microcontroller firmware may be programmed such that the oldest stored set is replaced with the newest over a preset amount. For example, if memory was provided for up to 6 fingerprint data sets, then when the $7^{th}$ print was recorded, it would overwrite the first. A small amount of memory would be allocated to keep track of the order of the data sets in a format called a circular buffer.

A mode could be provided which would allow an authorized user to erase all fingerprints stored in memory. For example, if the user first placed their finger on the fingerprint sensor and then turned the key to record, this could store the new fingerprint minutia, leaving previously stored data alone. If the user reverses the order and first turned the key to record and then placed their finger on the fingerprint sensor, this would erase all existing data and store the newly acquired fingerprint.

Figure 5:
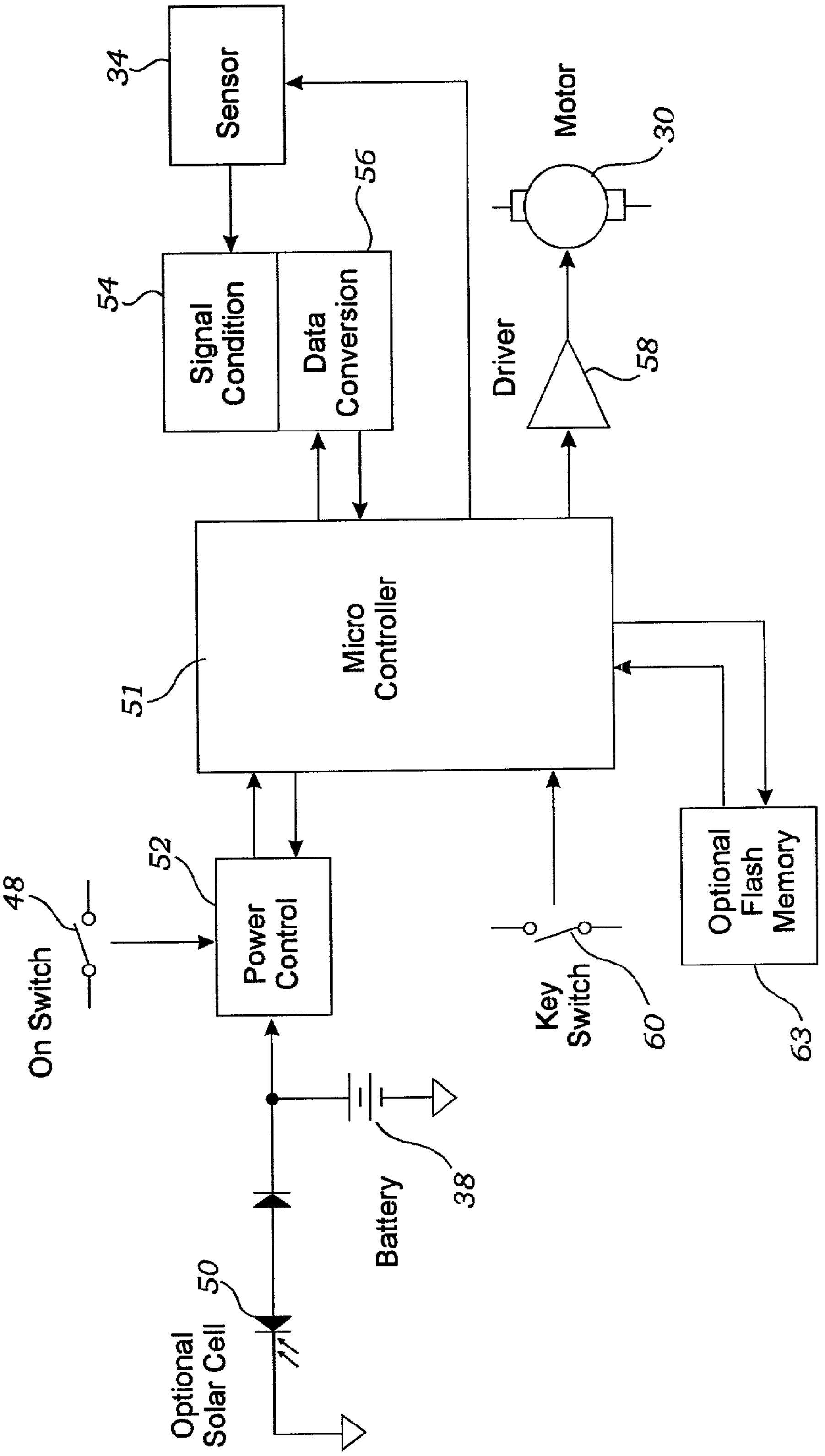
FIG. 5 is a block diagram of the operating circuit of device of the present invention having an electric motor.

FIG. 5 illustrates a block diagram of the padlock 10 of the present invention having a motor 30. The microcontroller 51 contains the logic necessary for reading the sensor 34 and determining when to open or lock the padlock 10. The power supply or battery system 38 may be charged by an optional solar cell 50, and a power control circuit 52 makes sure that the power supply 38 is not discharged during standby mode. The sensor 34 is connected to the microcontroller through signal conditioning means 54 and data conversion means 56. The output from the microcontroller 51 runs the motor 30 through a power driver 58. The key switch 60 is used to override the lock mechanism and to place the system into record mode to allow fingerprints of one or more authorized users to be entered into the system, as previously explained. An optional flash memory 63 may be used to store fingerprint patterns indefinitely, even when battery power is lost.

Figure 6:
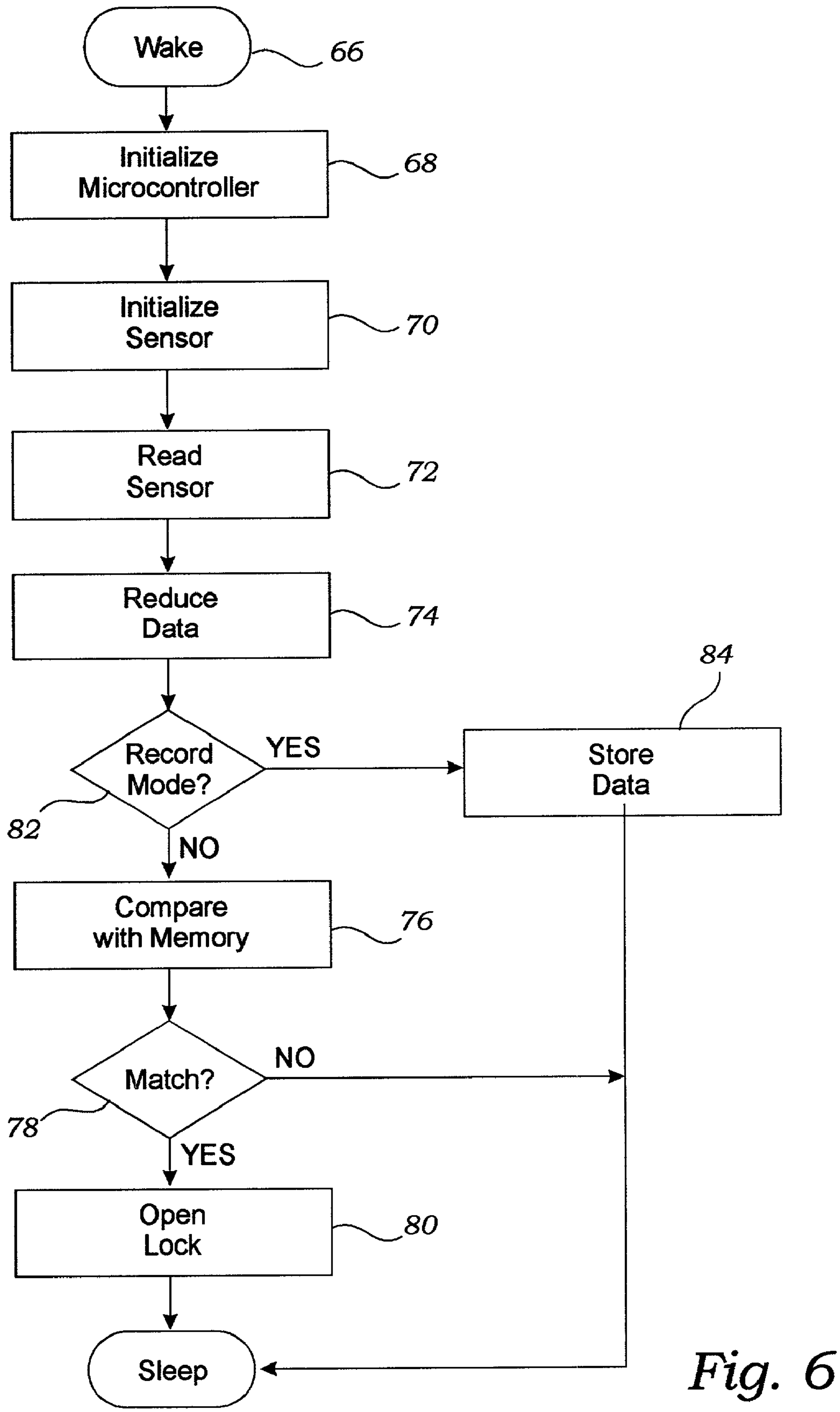
FIG. 6 is a flow diagram of the operation of the fingerprint reader of the present invention.

FIG. 6 is a flow diagram of the operation of the electronics of the device of the present invention. After one or more fingerprints have been stored in the lock, the lock is operated as follows: the pushbutton 48 is pushed to wake the circuitry at 66, and a finger is passed over the sensor; the wakeup signal will initialize the microcontroller at 68. The microcontroller will then send out the required control signals to initialize the sensor at 70 and will read data at 72. The data will then be analyzed at 74, 76 to determine if a valid fingerprint has been read, several attempts will be made to read a valid fingerprint and if a valid print is read at 78 then the lock will be opened at 80. After the lock is opened, the circuit will go back into sleep mode. When recording a fingerprint with the keyswitch 60 in the record mode at 82, steps 66, 68, 70, 72 and 74 will be performed. A fingerprint will then be recorded at 82 and stored at 84.

It is to be understood that the keyswitch 60 could be replaced by a combination or other type of lock for both opening the padlock and recording fingerprints by actuating a switch, similar to the keyswitch 60.

The electronics of the present invention may be programmed whereby if the system is run too many times, or receives too many false fingerprint readings, it will enter into an un-interruptible mode to prevent tampering. Once in the un-interruptible mode, the padlock 10 would then have to be actuated by the keyswitch 60, so as to be again capable of being actuated by use of the fingerprint sensor 34.

Those skilled in the art will appreciate that various adaptations and modifications of the just-described preferred embodiments can be configured without departing from the scope and spirit of the invention. Therefore, it is to be understood that, within the scope of the appended claims, the invention may be practiced other than as specifically described herein.

What is claimed is:

1. A fingerprint-operated padlock, comprising:

a fingerprint sensor mounted on a padlock body having a locking bar;

a gear portion secured to the locking bar;

an actuating mechanism secured to a drive gear held in the body;

the drive gear cooperating with the gear portion;

a locking element cooperating with the drive gear;

a latch arm held in the padlock body and connected to the locking element;

a solenoid operable to move the latch arm and release the locking element from the drive gear;

a microprocessor and a power source held in the padlock body and operatively connected between the fingerprint sensor and the actuating mechanism to allow the locking bar to be opened if a fingerprint stored in a memory is matched to a fingerprint read by the fingerprint sensor; and a button held on the padlock body to activate the power source.

2. The fingerprint-operated padlock of claim 1 wherein the actuating mechanism includes a manually actuated knob, rotatably held in the padlock body.

3. The fingerprint-operated padlock of claim 2, further including a keyswitch operated between three positions to open or close the padlock, or to record a plurality of fingerprints into memory.

4. The fingerprint-operated padlock of claim 1 wherein the actuating mechanism includes an electric motor.

5. The fingerprint-operated padlock of claim 4, further including a keyswitch operated between three positions to open or close the padlock, or to record a plurality of fingerprints into memory.

* * * * *